(12) United States Patent
Tenno et al.

(10) Patent No.: US 7,563,543 B2
(45) Date of Patent: Jul. 21, 2009

(54) NEGATIVE ELECTRODE OF LITHIUM ION SECONDARY BATTERY OBTAINED BY ISOSTATICALLY PRESSING A SPHERICAL GRAPHITE TO ELIMINATE VOIDS THEREIN

(75) Inventors: Koujiro Tenno, Nishinomiya (JP); Junichi Yasumaru, Sanda (JP); Shingo Asada, Sanda (JP); Naoki Matoba, Nishinomiya (JP); Satoshi Kubota, Nishinomiya (JP)

(73) Assignee: The Kansai Coke and Chemicals Co., Ltd. (JP)

( * ) Notice: Subject to any disclaimer, the term of this patent is extended or adjusted under 35 U.S.C. 154(b) by 768 days.

(21) Appl. No.: 10/892,569

(22) Filed: Jul. 14, 2004

(65) Prior Publication Data

US 2005/0014067 A1    Jan. 20, 2005

(30) Foreign Application Priority Data

Jul. 16, 2003    (JP)    ............................. 2003-198056

(51) Int. Cl.
*H01M 4/58*    (2006.01)
*H01M 4/02*    (2006.01)

(52) U.S. Cl. ................. 429/231.8; 429/231.4; 429/209; 429/218.1

(58) Field of Classification Search ............... 429/231.8, 429/231.4, 445, 448, 460, 461
See application file for complete search history.

(56) References Cited

U.S. PATENT DOCUMENTS 4,034,031 A * 7/1977 Lersmacher et al. ........ 264/400
6,139,990 A * 10/2000 Kubota et al. ............ 429/231.8

FOREIGN PATENT DOCUMENTS

| JP | 07335216 A | * 12/1995 |
| JP | 9-231974 | 9/1997 |
| JP | 11-263612 | 9/1999 |
| JP | 2000-294243 | 10/2000 |
| JP | 2000294243 A | * 10/2000 |
| JP | 2002-179419 | 6/2002 |

* cited by examiner

*Primary Examiner*—Dah-Wei D Yuan
*Assistant Examiner*—Zachary Best
(74) *Attorney, Agent, or Firm*—Gerald E. Hespos; Anthony J. Casella

(57) ABSTRACT

The present invention is characterized in that a negative electrode material for lithium ion secondary batteries containing graphite having high density and high isotropy is produced by pressing a spherical graphite isostatically. Use of said negative electrode material provides a negative electrode for lithium ion secondary batteries and a lithium ion secondary battery excellent in discharge load characteristics, cycle characteristics, and the like.

4 Claims, 4 Drawing Sheets

× 3,000

×3,000

×3,000

NEGATIVE ELECTRODE OF LITHIUM ION SECONDARY BATTERY OBTAINED BY ISOSTATICALLY PRESSING A SPHERICAL GRAPHITE TO ELIMINATE VOIDS THEREIN

BACKGROUND OF THE INVENTION

1. Field of the Invention

The present invention relates to a material for negative electrode of a lithium ion secondary battery and a process for manufacturing the same, and a negative electrode using the same and a lithium ion secondary battery using the negative electrode.

2. Description of the Related Art

In recent widespread use of mobile phones, personal digital assistants, video cameras, notebook computers, and others, there is an urgent need for improvement in performance of the batteries used in these electronic instruments. Various batteries such as lithium secondary battery, nickel hydride battery, nickel cadmium battery, and the like have been used in these electronic instruments, but among them, a lithium secondary battery is attracting attentions from the viewpoints of enablement of miniaturization and supply of high-voltage. The lithium secondary battery is a group of secondary batteries in which lithium is involved in the electromotive reaction, and more specifically classified into a lithium ion secondary battery that uses a carbon electrode as the negative electrode and a lithium cobalt complex oxide or the like as the positive electrode, and metal lithium secondary battery that uses a lithium alloy as the negative electrode. The lithium ion secondary battery employing a carbon electrode as the negative electrode is currently available in the market, but the lithium ion secondary battery with even higher performance is required.

Developments aimed at improving the performance of lithium ion secondary batteries have been intensively conducted from various viewpoints with respect to each component of the battery, such as an electrode, a separator, an electrolyte, and the like. Examples of such improvements with respect to carbon electrode constituting the negative electrode, are disclosed in Japanese Patent No.2983003 and Japanese unexamined patent publication No.2000-294243.

Carbon electrodes, which are used as the negative electrode in lithium ion secondary batteries, are generally produced by coating and drying a paste containing a graphite particle onto a current collector such as copper sheet or the like, and pressing the coated material. In particular, if a graphite in flake form (hereinafter, simply referred to as "flake graphite") is used as the graphite constituting the negative electrode, the flake graphite particle orients itself along the surface of the current collector by pressing, resulting in lower permeability of the electrolyte. Lower permeability of electrolyte into the electrode causes a problem of decrease in the fast charging/discharging characteristics of the battery.

Other requirements in property for the lithium ion secondary battery that employs a carbon electrode as the negative electrode are, for example, initial efficiency and cycle characteristic. When a lithium ion secondary battery is charged for the first time, a part of the electric charges are consumed for forming a passive layer on the surface of the negative electrode (carbon electrode) and thus not all of the electric charges the battery received by charging are discharged. Therefore, the first discharge capacity will be smaller than the first charge capacity. The ratio of the first discharge capacity to the first charge capacity is defined as an initial efficiency. In addition, if a lithium ion secondary battery is charged and discharged repeatedly, the discharge capacity gradually becomes smaller than the discharge capacity in the first cycle. The decline in discharge capacity relative to the discharge capacity in the first cycle is called a cycle characteristic. The initial efficiency and the cycle characteristic are the important requirements in property for lithium ion secondary batteries and it is required to improve them.

SUMMARY OF THE INVENTION

The present invention has been achieved taking into account the circumstances above, and an object of the present invention is to provide a material for a negative electrode of the lithium ion secondary battery excellent in the end-use requirements such as initial efficiency, cycle characteristic, discharge load characteristics and the like. Another object of the present invention is to provide a process of manufacturing the same, and a negative electrode using the same, and a lithium ion secondary battery using the negative electrode.

The present invention provides a process for manufacturing a material for a negative electrode of the lithium ion secondary battery (hereinafter, may be referred to as the "negative electrode material") containing a graphite particle having high density and high isotropy, and utilizes the negative electrode material. That is, the negative electrode material containing a graphite particle having high density and high isotropy provides larger voids among the graphite particles, thus improves the permeability of the electrolyte of the lithium ion secondary battery, if compared with the negative electrode material containing conventional graphite particle at the same negative electrode density. In addition, even when pressed to form the negative electrode, such graphite particle having high isotropy is more resistant to orientation of the crystal structure of graphite and does not lower the permeability of electrolytes. Alternatively, at the same void rate (or spatial filling rate), the negative electrode material containing a graphite particle having high density and high isotropy allows to produce the negative electrode having a higher density, thus enhances the capacity of the lithium ion secondary battery obtained. In the present invention, use of these properties of the graphite particles allows improvement in the discharge load characteristics, cycle characteristics, and the like of the resulting lithium ion secondary batteries.

The process of the present invention is characterized in isostatically pressing a spherical graphite, more preferably isostatically pressing a spherical graphite to obtain a molded material and pulverizing the molded material. The spherical graphite used as the starting material is inherently higher in isotropy than the flake graphite. In the present invention, the isostatic pressing of the spherical graphite further gives the higher isotropy thereof, and concurrently raises the density thereof by eliminating the voids within the spherical graphite particle. In addition, use of such a previously graphitized material as the starting material dispense with the step of graphitizing cokes and binder components. Generally, heat treatment at a temperature of over 2,000° C. will be essential for the graphitizing step of the cokes and binder components. Thus, the graphitizing leads to disadvantage from an economical viewpoint.

In the present invention, the term "a graphite" when indicated means either a graphite as "a single particle" or a graphite as "an aggregated of multiple particles" , independent of the shape. In the similar manner, the term "a graphite particle", sometimes indicated for convenience here in this specification considering the individual characteristic of graphite particle, is not limited to "a single graphite particle", but also means "an aggregate of multiple graphite particles".

The present invention provides a process for manufacturing a material for a negative electrode of a lithium ion secondary battery, comprising pressing a spherical graphite isostatically.

The present invention further provides a material for a negative electrode of a lithium ion secondary battery, comprising a graphite obtainable by the process comprising pressing a spherical graphite isostatically.

The present invention yet further provides a negative electrode of a lithium ion secondary battery, comprising a material including a graphite which is obtainable by the process comprising pressing a spherical graphite isostatically.

The present invention yet further provides a lithium ion secondary battery, comprising a negative electrode which comprises a material including a graphite which is obtainable by the process comprising pressing a spherical graphite isostatically.

DESCRIPTION OF PREFERRED EMBODIMENTS (1) Process for Manufacturing a Material for a Negative Electrode of the Lithium Ion Secondary Battery The process of the present invention for manufacturing the material for the negative electrode of the lithium ion secondary battery comprises pressing a spherical graphite isostatically, preferably comprises the steps of pressing a spherical graphite isostatically to obtain the molded material and pulverizing the molded material. The present invention provides a negative electrode material containing a graphite particle having high density and high isotropy.

First, the spherical graphite used in the present invention will be described. The spherical graphite is not particularly limited if the shape of the graphite particle is spherical, and may be obtained, for example, by forming a flake graphite into the spherical graphite. Examples of the spherical graphite are a spherical graphite where the flake graphite is bulbed up at random or like a cabbage, or a spherical graphite where the flake graphite is pulverized into species and aggregates. The spherical graphite is higher in isotropy than the flake graphite, thus, employing and isostatically pressing the spherical graphite as a starting material provides a negative electrode material containing the graphite particle having further enhanced isotropy. In addition, since the material previously graphitized is used as the starting material, the use of spherical graphite has an advantage that it can eliminate the graphitizing step which is required when cokes or the like are used as the starting material.

In a preferred embodiment, the process may further comprise forming a flake graphite into the spherical graphite. The spherical graphite can be obtained, for example, by pulverizing the flake graphite into the pieces and aggregating the pieces together to obtain the spherical graphite. The specific process for producing the spherical graphite is not particularly limited, but includes a process proposed earlier by the present inventors in Japanese Unexamined Patent Publication No. H11-263612 or the similar process. Hereinafter, an example of the manufacturing process will be described with reference to Figures.

Figure 1:
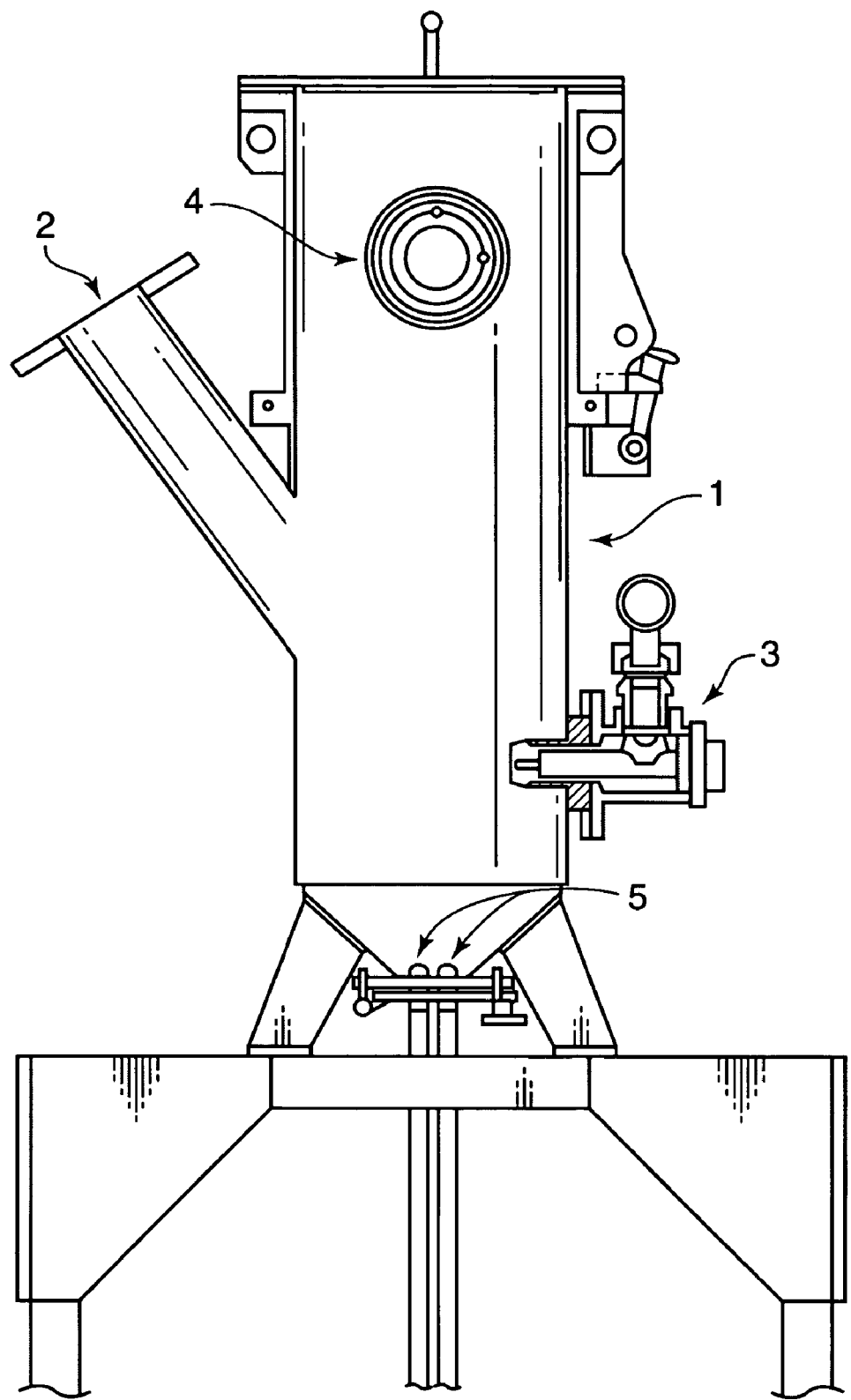
FIG. 1 is a schematic diagram illustrating an apparatus for producing spherical graphite.

FIG. 1 is a schematic diagram illustrating an apparatus for producing spherical graphite, wherein 1 is tank; 2, feeder; 3, inward-directed nozzle; 4, classifier; and 5, blow-up nozzle. A flake graphite (raw material) is supplied into the tank 1 through the feeder 2 attached to the tank. The hopper-type feeder 2 is preferably placed at a suitable position of the tank 1, and may serve as the outlet for withdrawing the spherical graphite prepared. Alternatively, a screw-type feeder 2 may be placed at the lower portion of the tank 1. The amount of raw material supplied into the tank 1 may be determined appropriately based on the capacity of the tank 1. A collision area is formed at the lower portion of the tank 1, by placing an inward-directed nozzle 3 penetrating through the sidewall of the tank 1 and supplying a jet stream from the inward-directed nozzle 3. The jet stream directed to the collision area brings the flake graphite into collision, and the flake graphite aggregates, or reaggregates while being pulverized to give the spherical particles.

It is preferable to place multiple (e.g., 3 to 4) inward-directed nozzles 3. The speed of the jet stream blown from the inward-directed nozzle 3, flow rate of the blow gas, internal pressure of the tank, and the like, are properly adjusted for achieving smooth collision and flow in the collision area. In addition, adjusting the operational period allows to give the spherical graphite. More specifically, the nozzle discharge pressure is preferably, for example, about 0.01 to 0.50 MPa; the gas flow rate, about 0.2 to 1.0 Nm$^3$/min; internal pressure in the tank, about −10 to 30 kPa; and the operational period, about 1 to 100 minutes. The gas blown from the inward-directed nozzle 3 may include air, nitrogen, steam, or the like, and the temperature in the tank 1 may be about 0 to 60° C. Due to the convection of gas generated in the tank 1, the spherical graphite particles obtained by the collision in the collision area at the lower portion of the tank 1 are blown upward along the convection current to the upper portion of the tank 1 and then conveyed downward. In other words, the particles are circulating in the tank 1, by being blown upward near the central portion of the tank 1 and descending downward along the sidewall of the tank 1. A classifier 4, installed at the upper portion of the tank 1, discharges finer particles having a diameter smaller than its classification limit from the tank 1. Any classifier known in the art may be used as the classifier 4, but a high-speed rotary classifier is usually used. The discharge amount varies depending on the particle size of the flake graphite used as the raw material.

The operation above is preferably conducted in batch. The spherical graphite particle thus obtained can be recovered through the feeder 2, by blowing air into the tank 1 via the blow-up nozzle 5 installed at the bottom of the tank 1.

A natural flake graphite or a synthetic flake graphite may be used as the raw material for forming the spherical graphite particle. For example, the natural flake graphite, generally obtainable at a purity of 85% to 99% or more, may be used directly. It is also preferable to raise the purity of the graphite by any method known in the art where necessary. There is a variety of the flake graphite different in particle size. For example, the flake graphite having an average particle diameter of about 10 to 60 μm is preferably used as the flake graphite (raw material)

The shape of the spherical graphite particle used in the present invention includes the spheroidal shape such as a rugby ball as well as the spherical shape such as a soccer ball and a tennis ball. The shape of the spherical graphite particle preferably has, without limitation, the circularity degree of about 0.86 or more. Since the circularity degree is an indicator calculated from the projected two-dimensional figure of a three-dimensional graphite particle, the commercially available natural flake graphite particle has, for example, the circularity of about 0.84. Although the natural flake graphite particle has the similar circularity to those of the spherical graphite used in the present invention, the natural flake graphite particle (raw material) is absolutely different in the plane particle from the spherical graphite particle which are three dimensional in the present invention. The circularity degree is determined according to the following formula (see Japanese Unexamined Patent Publication No. H11-263612).

Circularity degree=(Peripheral length of equivalent circle)/(Peripheral length of the projected figure of a particle)

Herein, the equivalent circle is a circle having the same area as the projected area of the particle measured; and the peripheral length of the projected figure of a particle is a length of the peripheral circle obtained by connecting the edge points of the binary image of the particle.

In addition, the spherical graphite used in the present invention preferably has a peak intensity ratio ($Ih_{110}/Ih_{002}$) of 0.004 or more, more preferably 0.006 or more, wherein the peak intensity ratio ($Ih_{110}/Ih_{002}$) is a ratio of the peak intensity ($Ih_{110}$) assigned to the 110 plane (plane perpendicular to the graphite layers) to the peak intensity ($Ih_{002}$) assigned to the 002 plane (plane parallel to the graphite layers) as determined by X-ray diffraction measurement. Pressing the spherical graphite having the isotropy of peak intensity ratio relatively as high as 0.004 or more, provides a negative electrode material containing the graphite particle having even higher isotropy.

In the manufacturing process according to the present invention, the above spherical graphite is pressed isostatically. The isostatic pressing of the spherical graphite further gives the higher isotropy of the spherical graphite, and concurrently eliminates the voids therein, thereby enhancing the density of the spherical particle. The isostatic pressing method is not particularly limited, and examples of the methods include the method of isostatically pressing spherical graphite by using a pressurizing medium such as a gas, a liquid, or the like, and more specifically, hot isostatic pressing method whereby the graphite are isostatically pressed at high or elevated temperature, and cold isostatic pressing method whereby the graphite is isostatically pressed at room temperature using a pressurizing medium such as water or argon, and the like.

The pressing of the spherical graphite is, without limitation, preferably conducted under the pressure of 50 kgf/cm$^2$ (490.5×10$^4$ Pa) or more, more preferably 100 kgf/cm$^2$ (981× 10$^4$ Pa) or more, and most preferably 200 kgf/cm$^2$ (1,962×10$^4$ Pa) or more. If the pressure is less than 50 kgf/cm$^2$, the density and isotropy of the graphite particle are not sufficiently raised. The upper limit of the pressing pressure is not particularly limited.

In another preferred embodiment, a binder such as pitch, tar, or the like is not used during the pressing. The use of a binder such as pitch or the like is disadvantageous economically, as it needs the graphitization thereof by heating at a high temperature of 2,000 to 3,000° C. In addition, if the binder such as pitch or the like is used and not graphitized, it results in a problem of decrease in the capacity of the resulting battery.

The present invention preferably comprises pulverizing the molded material obtained by pressing the spherical graphite, more preferably pulverizing the molded material into pieces. The pulverization of the molded material provides the negative electrode material containing the graphite particle having high density and high isotropy, for the lithium ion secondary battery. Particularly in the present invention, since no binder is used during the pressing step, the molded material thus obtained is easily pulverized by applying only a small shearing force to the molded material. The pulverization method is not particularly limited and, for example, the molded material may be pulverized by using a conventional mixer having agitating blades. Alternatively, the molded material may be pulverized by using any one of ordinary pulverizers known in the art such as jet mill, vibrating mill, pin mill, hammer mill.

The graphite particle obtained by the manufacturing process according to the present invention is characteristic in being high in density and isotropy. Since it is difficult to determine the true density of the graphite particle obtained by the manufacturing process according to the present invention, the bulk density of the graphite can be used as an indicator of the true density. The bulk density is not particularly limited, but is preferably 0.3 g/cm$^3$ or more, and more preferably 0.5 g/cm$^3$ or more. If the negative electrode material contains the graphite having a bulk density of less than 0.3 g/cm$^3$, the discharge load characteristic and cycle characteristic of the resulting battery will be lowered. On the other hand, the upper limit of the bulk density of the graphite contained in the negative electrode material is not particularly limited, but restricted only by the theoretical density of graphite, 2.2 g/cm$^3$.

The isotropy of the graphite particle obtained by the manufacturing process according to the present invention, can be also represented by the peak intensity ratio ($Ih_{110}/Ih_{002}$). As described above, the peak ratio is a ratio of the peak intensity assigned to the 110 plane (plane perpendicular to the graphite layers) to the peak intensity assigned to the 002 plane (plane parallel to the graphite layers) as determined by X-ray diffraction method. The graphite particle obtained by the manufacturing process according to the present invention preferably has the peak intensity ratio ($Ih_{110}/Ih_{002}$) of 0.008 or more, more preferably 0.010 or more. The graphite particle having a peak intensity ratio preferably of 0.008 or more, suppress the orientation of the crystal structure of graphite when forming the negative electrode by press-molding, thus provides the negative electrode having the excellent permeability of electrolyte.

The specific surface area of the graphite particle obtained by the manufacturing process according to the present invention is preferably 0.5 m$^2$/g or more, more preferably 1 m$^2$/g or more, and preferably 10 m$^2$/g or less, more preferably 7 m$^2$/g or less. A specific surface area of over 10 m$^2$/g leads to increase in the amount of the passive layer formed on the surface of negative electrode material (graphite) and reduction in the initial efficiency of the resulting battery. On the contrary, a specific surface area of less than 0.5 m$^2$/g leads to decrease in the contact area to electrolyte and consequently decrease in fast charging/discharging characteristics. The specific surface area may be determined by the BET method based on N$_2$ absorption using the "ASAP-2405" analyzer manufactured by Micrometrix.

The graphite particle obtained by the manufacturing process according to the present invention has preferably an average particle size of 5 to 100 µm. It is because an average particle size of less than 5 µm causes to increase in specific surface area and decrease in permeability through particles, while an average particle size of over 100 µm causes to the nonuniformity of the electrode and hence decrease in fast charging/discharging characteristics. The average particle size may be determined by using the "SALD-2000" laser diffraction particle size analyzer manufactured by Shimadzu Seisakusyo Co,.

(2) Negative Electrode Material for Lithium Ion Secondary Battery

The negative electrode material for lithium ion secondary battery according to the present invention comprises the graphite prepared by the manufacturing process described above. The use of the graphite prepared by the manufacturing process according to the present invention as the negative electrode material further enhances the performance of the lithium ion secondary battery. In addition, the negative electrode material for lithium ion secondary battery according to the present invention may further contain another conventional graphite material such as the natural graphite and the synthetic graphite in the range that does not deteriorate the advantageous effects of the present invention, in addition to the graphite prepared by the manufacturing process described above. The negative electrode material of the present invention contains the graphite prepared by the above manufacturing process in an amount of preferably 50 mass % or more, more preferably 70 mass % or more, and most preferably 90 mass % or more.

(3) Negative Electrode for Lithium Ion Secondary Battery

The negative electrode of the lithium ion secondary battery according to the present invention comprises the negative electrode material according to the present invention described above. The negative electrode according to the present invention is obtained, for example, by preparing a slurry where the negative electrode material and a binder for preparing electrodes are dispersed in water or an organic solvent, applying the slurry onto a current collector such as a copper sheet, and drying and pressing the resulting coated film. The binder for preparing the electrode includes, for example, a fluorinated polymer compound such as polytetrafluoroethylene, polyvinylidene fluoride, vinylidene fluoride/hexafluoropropylene copolymer, tetrafluoroethylene/hexafluoropropylene/vinylidene fluoride copolymer; carboxymethylcellulose, styrene-butadiene, acrylonitrile-butadiene, and the like.

The negative electrode of the present invention preferably has, without limitation, the density of 1.2 to 2.0 g/cc (1.2 to $2.0 \times 10^3$ g/l) and more preferably the density of 1.5 to 1.8 g/cc (1.5 to $1.8 \times 10^3$ g/l). If the density of the negative electrode is less than 1.2 g/cc ($1.2 \times 10^3$ g/l), the battery capacity tends to decrease, while if it is over 2.0 g/cc ($2.0 \times 10^3$ g/l), permeability tends to decrease.

(4) Lithium Ion Secondary Battery

Figure 2:
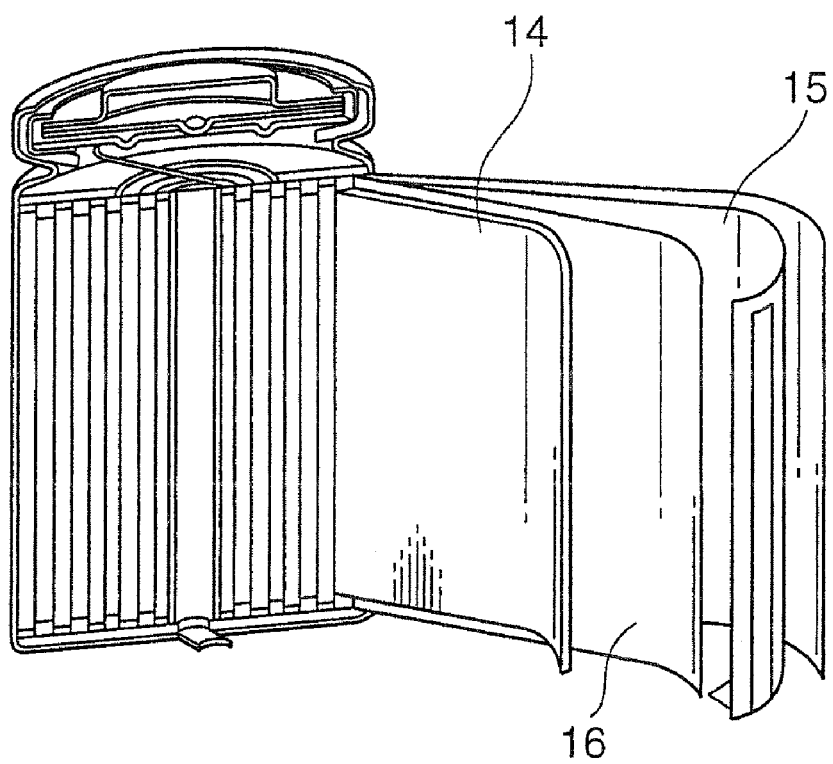
FIG. 2 is a perspective view illustrating an example of the inner structure of a cylinder-cell lithium ion secondary battery according to the present invention.
Figure 3:
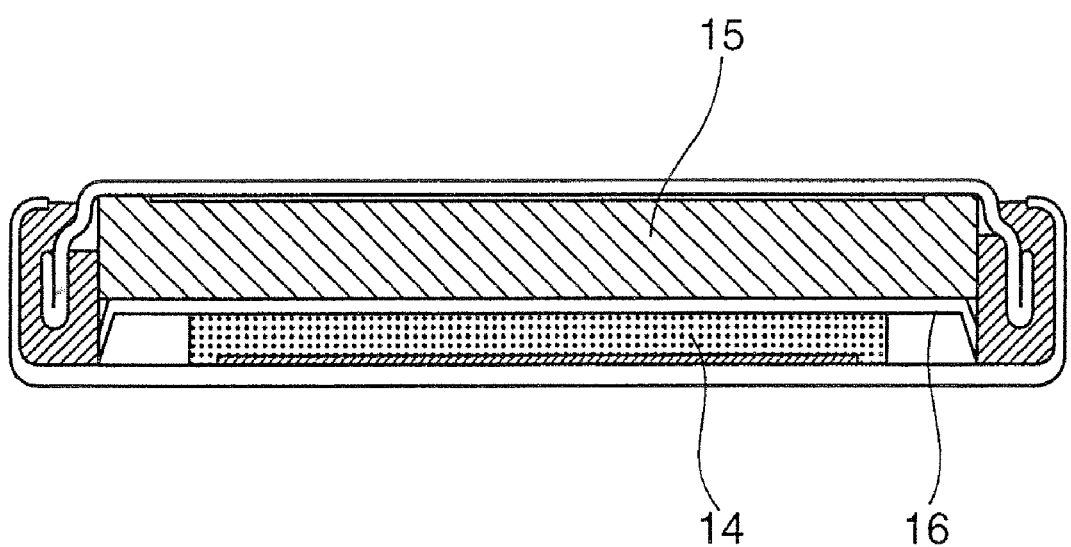
FIG. 3 is a cross sectional view illustrating an example of the inner structure of a button-type lithium ion secondary battery according to the present invention.

The lithium ion secondary battery of the present invention comprises the above negative electrode of the present invention. The lithium ion secondary battery of the present invention is not particularly limited, as long as it uses the negative electrode of the present invention. The shape of the lithium ion secondary battery may be, for example, cylinder cell (dry-cell battery), square cell, button-type, coin type, or others. FIG. 2 is a perspective view illustrating an example of the inner structure of a cylinder-cell (dry-cell) lithium ion secondary battery, i.e., a spiral structure in which a pair of a sheet-shaped positive electrode 14 and a negative electrode 15 separated with a sheet of a separator 16 are wound spirally. FIG. 3 is a cross sectional view illustrating an example of a button-type lithium ion secondary battery, which comprises a pair of positive electrode 14 and negative electrode 15 separated by a separator 16. The electromotive reaction is conducted by mutual migration of lithium ions via the electrolyte solution between the positive and negative electrodes.

The positive electrode material for the lithium ion secondary battery includes, for example, a lithium complex oxide such as $LiCoO_2$, $LiNiO_2$, $LiNi_{1-y}Co_yO_2$, $LiMnO_2$, $LiMn_2O_4$, $LiFeO_2$, and the like. A lithium cobalt complex oxide is most preferable among them. Examples of the binder for positive electrodes are polyvinylidene fluoride, polytetrafluoroethylene. As the electrolyte solution, used is a solution of an electrolyte (electrolyte salt), such as $LiPF_6$, $LiBF_4$, $LiClO_4$, $LiCF_3SO_3$, $LiAsF_6$, or the like, dissolved in an organic solvent such as ethylene carbonate or the like, or a mixed solvent containing the organic solvent and a low-boiling-point solvent such as dimethyl carbonate, diethyl carbonate, 1,2-dimethoxyethane, 1,2-diethoxymethane, ethoxymethoxyethane, or the like. Alternatively, a solid electrolyte may be used in place of the electrolyte solution above. The separator used for separating the positive and negative electrodes includes a non-woven fabric, a cloth, or a microporous film, which contains a polyolefin resin such as polyethylene, polypropylene, or the like as the main component.

EXAMPLE

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[1] Evaluation Methods for Properties

The properties of the obtained negative electrode material for lithium ion secondary battery and the initial efficiency, discharge load characteristic, and, cycle characteristic of the lithium ion secondary battery were evaluated according to the following methods:

(i) Isotropy

In the preliminary X-ray diffraction measurements, the ratio ($Ih_{110}/Ih_{002}$) of the peak intensity assigned to 110 plane (plane perpendicular to the graphite layers) to the peak intensity assigned to the 002 plane (plane parallel to the graphite layers) determined by X-ray diffraction measurement, was found to be scarcely affected by the operational and rotational speeds, and thus was determined under the following conditions:

Apparatus: "RINT2000" manufactured by Rigaku Corp.
Cell: internal diameter, 2.4 cm; height, 0.315 cm Preparation of sample for the cell: 2.29 g of the negative electrode material was weighed and placed in a mold having a radius of 1.2 cm, pressed under a load of 500 kg until the thickness thereof becomes 0.315 cm.
Sample density: 1.6 g/cm$^3$
Diffraction angle: 3 to 900°
Operational speed: 90°/min
Rotating speed: 60 rpm
Data processing: Intensity calculation by integration; number of smoothing point: 9; and automatic background correction. The peak intensity ratio was calculated from the peak area assigned to the 002 plane (26.5°) and the peak area assigned to the 110 plane (77.5°) according to the following formula.

Peak intensity ratio $(Ih_{110}/Ih_{002})$=(Peak area assigned to 110 plane)/(Peak area assigned to 002 plane)

(2) Bulk Density

A 100 cc container is placed beneath a 60-mesh sieve. A test powder was allowed to fall through the sieve freely into the container. After the excessive powder over the container was removed, the weight of the powder was determined, to give the bulk density.

(iii) Initial Efficiency

A battery was charged at a constant current [current density of 0.4 mA/cm$^2$(0.1 C)] until the voltage reached 0 V, and then at a constant voltage of 0 V until the current reaches 0.01 mA/cm$^2$. The battery was discharged at a constant current of 0.4 mA/cm$^2$ until the voltage reaches 1 V.

The initial efficiency of the battery was calculated from the first charge and discharge capacities according to the following formula.

Initial efficiency (%)=100×[(First discharge capacity)/(First charge capacity)]

(iv) Discharge Load Characteristic

The discharge load characteristic of the battery is indicative of the fast charge/discharge characteristics of the battery, were calculated from the discharge capacity determined at a discharge current of 0.37 mA/cm$^2$ (0.1 C) and the discharge capacity under a discharge current of 9.25 mA/cm$^2$ (2.5 C) according to the following formula.

Discharge load characteristic (%)=100×[(Discharge capacity at 9.25 mA/cm$^2$)/(Discharge capacity at 0.37 mA/cm$^2$)]

(v) Charge/Discharge Cycle Characteristics

The battery was charged at a constant current of 6.4 mA until the voltage reaches 4.2V and then at a constant voltage of 4.2V until the current reaches 0.2 mA. The battery was discharged at a constant current of 6.4 mA until the voltage reaches 3.0 V. The cycle characteristic of the battery was calculated from the discharge capacity in the first cycle, and the discharge capacities after 50, 100, 200 cycles of charging/discharging, according to the following formula:

Cycle characteristic (%)=100×[(Discharge capacities in 50th, 100th, or 200th cycle)/(Discharge capacity in the first cycle)]

[2] Production of Negative Electrode Material for the Lithium Ion Secondary Battery Example 1

A natural flake graphite having an average particle size of 20 μm was formed into the spherical graphite using the "COUNTER JET MILL 100AFG" manufactured by Hosokawamicron, under the conditions of a sample amount of 200 g, a nozzle discharge of air pressure 0.20 MPa, and an operational period of 20 minutes. The obtained spherical graphite was subjected to cold hydrostatic pressing (isostatic pressing) under a pressure of 400 MPa for 5 minutes using the "CIP equipment (WET-CIP)" manufactured by Kobe Steel, to give a molded material having a weight of 550 g, a diameter of 40 mm, and a height of 200 mm. The molded material thus obtained was pulverized in a mortar to obtain the negative electrode material A for the lithium ion secondary battery.

Example 2

The spherical graphite obtained in Example 1 was used, without isostatically pressing, as negative electrode material B for the lithium ion secondary battery.

Example 3

A natural flake graphite particle having an average particle size of 20 μm was subjected to cold hydrostatic pressing (isostatic pressing) using the "CIP equipment (WET-CIP)" manufactured by Kobe Steel under a pressure of 400 MPa for 5 minutes, to give a molded material having a diameter of 40 mm, a height of 200 mm, and a weight of 550 g. The molded material thus obtained was pulverized in a mortar to give the negative electrode material C for the lithium ion secondary battery.

Example 4

A natural flake graphite having an average particle size of 20 μm was used as it is as the negative electrode material D for the lithium ion secondary battery.

[3] Preparation of the Negative Electrode for the Lithium Ion Secondary Battery

Negative electrodes for lithium ion secondary battery (coin type) were prepared respectively from negative electrode materials A to D, according to the following procedures. First, 1 mass part of carboxymethylcellulose and 1 mass part of styrene butadiene powder were added as a binder to 100 mass parts of the negative electrode material, and 100 mass parts of pure water was added to give a slurry. The slurry thus obtained was coated on a copper sheet having a thickness of 18 μm, and the coated copper was dried in a drier (100° C.) for 15 minutes. After drying, the dried film was cut out into circular pieces having a diameter of 1.6 cm. The amount of the coated material on the copper sheet was determined to be 20 mg. The coated film thus prepared was pressed by a roller press so that the coated material on the copper sheet has the density of 1.6 g/cc (1.6×10$^3$ g/l), or, 1.8 g/cc (1.8×10$^3$ g/l) to give the negative electrodes A to D for the lithium ion secondary battery.

[4] Preparation of the Lithium Ion Secondary Battery

A lithium foil was used as the positive electrode of the lithium ion secondary battery (coin type) for determining the initial efficiency and discharge load characteristics thereof, while an electrode having LiCoO$_2$ as the active substance, as the positive electrode of the lithium ion secondary battery for determining the cycle characteristics. The electrode having LiCoO$_2$ as the active substance was prepared according to the following procedures. 5 mass parts of polyvinylidene fluoride (PVdF) as a binder and 5 mass parts of carbon black as a conductive material were added to 90 mass parts of LiCoO$_2$. After the mixture was well blended, 200 mass parts of N-methyl-2-pyrrolidone (NMP) was added, to give a slurry. The slurry thus obtained was coated on an aluminum foil having a thickness of 30 μm, and the coated foil was dried in a drier (100° C.) for 1 hour. After drying, the dried film was cut out into circular pieces having a diameter of 1.6 cm. The amount of the coated material on the aluminum foil was determined to be 45 mg. The coated film was pressed by a roller press so that the coated material on aluminum foil has the density of 2.8 g/cc (2.8×10$^3$ g/l) to obtain a positive electrode for the lithium ion secondary battery.

Lithium ion secondary batteries (coin type) A to D were prepared by placing the positive electrode thus obtained and the respective negative electrodes prepared from the negative-electrode materials A to D, facing each other through a separator, in a stainless steel cell. The batteries were constructed under an argon atmosphere. 0.4 mL of 1 M LiPF$_6$/(EC+DMC) was used as the electrolyte solution, while the "CELGARD #3501 (brand name)" manufactured by CELGARD was used as the separator. The electrolyte solution was a solution prepared by dissolving LiPF$_6$ to a concentration of 1 M in a mixed solvent containing ethylene carbonate (EC) and dimethyl carbonate (DMC) at a volume rate of 1:1 (brand name: "SOLULYTE" manufactured by Mitsubishi Chemical Corp.).

The properties of the negative electrode materials A to D thus obtained are summarized in TABLE 1, and the measured results of the initial efficiency, discharge load characteristics, and cycle characteristic of the lithium ion secondary batteries thus obtained are summarized in TABLE 2 (electrode density: 1.6 g/cc (1.6×10$^3$ g/l)), and TABLE 3 (electrode density: 1.8 g/cc (1.8×10$^3$ g/l)). In addition, the cross sections of graphite particles contained in the negative electrode materials A and D were observed by an electron microscope.

TABLE 1

| | Average particle diameter μm | Peak intensity ratio (Ih$_{110}$/Ih$_{002}$) | Specific surface area m$^2$/g | Bulk density g/cm$^3$ |
|---|---|---|---|---|
| Negative-electrode material A | 17 | 0.0165 | 5.5 | 0.64 |
| Negative-electrode material B | 17 | 0.0112 | 5.3 | 0.54 |
| Negative-electrode material C | 21 | 0.0084 | 5.6 | 0.38 |
| Negative-electrode material D | 20 | 0.0018 | 5.5 | 0.17 |

As apparent from TABLE 1, the peak intensity ratio of the negative electrode material A (Ih$_{110}$/Ih$_{002}$), which was prepared by isostatically pressing the spherical graphite and pulverizing the molded material thus obtained, was 0.015 or more, and thus remarkably higher in isotropy than those of the negative electrode materials B to D. In addition, the peak intensity ratio of the negative electrode material B was 0.0112, and larger than that of the negative electrode material C (0.0084), indicating that the isotropy of spherical graphite used as a starting material in the present invention is much higher than the isotropy of the negative electrode material C, which was prepared by isostatically pressing a flake graphite. Further, the peak intensity ratio of the negative electrode material A (0.0165) is higher than the peak intensity ratio of the negative electrode material B (0.0112), which was the spherical graphite used as the starting material for negative electrode material A. This fact indicates that the isotropy was additionally raised by isostatic pressing of the starting material, spherical graphite.

Figure 4:
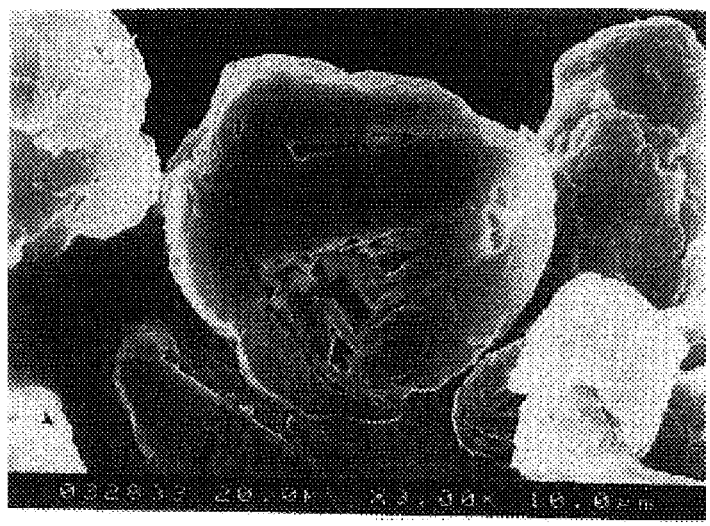
FIG. 4 is an electron micrograph showing an example of the cross section of spherical graphite used as a starting material of the present invention (magnification: 3,000).
Figure 5:
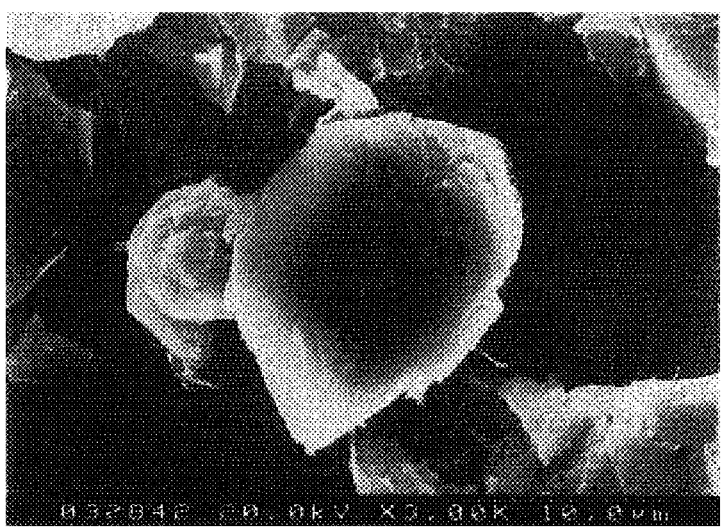
FIG. 5 is an electron micrograph showing an example of the cross section of the graphite particle contained in the negative electrode material according to the present invention material (magnification: 3,000).

FIG. 4 is a photo showing the cross sectional view of the spherical graphite (negative electrode material B), i.e., a starting material of the present invention, which demonstrates that there are some observable voids inside the particles. FIG. 5 is a photo showing the cross sectional view of the particles obtained after isostatic pressing of the spherical graphite and pulverizing the molded material (negative electrode material A), demonstrating that the voids observed inside the spherical graphite in FIG. 4 are eliminated. These observations confirm that the graphite particles contained in the negative electrode material according to the present invention have higher density and the voids in the particles are eliminated.

TABLE 2

| Battery | Negative-electrode material | Initial Efficiency (%) | Discharge load characteristics (%) | Cycle characteristics (%) | | |
|---|---|---|---|---|---|---|
| | | | | 50 | 100 | 200 |
| Battery A | Negative-electrode material A | 93.0 | 91.4 | 91.2 | 88.4 | 83.5 |
| Battery B | Negative-electrode material B | 93.0 | 89.2 | 90.8 | 85.3 | 77.5 |
| Battery C | Negative-electrode material C | 92.5 | 83.2 | 89.3 | 81.3 | 72.1 |
| Battery D | Negative-electrode material D | 92.4 | 58.4 | 82.5 | 75.1 | 60.4 |

Electrode density: 1.6 g/cc

The measured results of the properties of the lithium ion secondary batteries using a negative electrode having an electrode density of 1.6 g/cc (10$^3$ g/l) are summarized in TABLE 2. The Battery A uses, as the negative electrode, the negative electrode material A, which was prepared by pressing the spherical graphite and pulverizing the molded material. The initial efficiency of battery A was 93.0%. In addition, the discharge load characteristics of the battery A was 91.4%, and higher than the discharge load characteristics of conventional batteries B to D in the range of 58.4 to 89.2%. The battery A was also excellent in cycle characteristics. Although the cycle characteristics of the battery A declined slightly as the cycle number increased, the decreasing rates were significantly smaller than those of the batteries B to D, which used the conventional negative electrode materials.

In addition, the discharge load characteristic and the cycle characteristic in the 200th cycle of the battery D were quite low, respectively at 58.4% and 60.4%. It is probably because the permeability of the electrolyte into the negative electrode is reduced due to the direct use of a flake graphite as the negative electrode material. In contrast, the favorable discharge load characteristics and cycle characteristics of the battery A were obtained probably due to the favorable permeability of the electrolyte into the negative electrode, which was prepared using the negative electrode material A according to the present invention.

TABLE 3

| Battery | Negative-electrode material | Discharge load characteristics (%) | Cycle characteristics(%) | | |
|---|---|---|---|---|---|
| | | | 50 | 100 | 200 |
| Battery A | Negative-electrode material A | 90.8 | 90.5 | 86.8 | 79.9 |
| Battery B | Negative-electrode material B | 83.5 | 85.2 | 80.2 | 71.3 |
| Battery C | Negative-electrode material C | 72.6 | 81.4 | 75.4 | 62.1 |
| Battery D | Negative-electrode material D | 31.5 | 73.4 | 60.1 | 44.3 |

Electrode density: 1.8 g/cc

The measured results of the properties of the lithium ion secondary batteries using a negative electrode having an electrode density of 1.8 g/cc (10$^3$ g/l) are summarized in TABLE 3. The Battery A was excellent in the discharge load characteristics and cycle characteristics, in the similar manner to those in TABLE 2. In addition, comparison between the results in TABLES 2 and 3 indicates that although the discharge load characteristics and cycle characteristics of the batteries tend to decrease as the electrode density is raised, the battery A, i.e., EXAMPLES according to the present invention, had significantly smaller decreasing rates and exhibited excellent properties even at a high electrode density. The excellent discharge load characteristics and cycle characteristics exhibited, even when the density of the negative electrodes were raised, are likely because isostatic pressing of spherical graphite eliminated the internal voids in graphite particles, raising the density and at the same time the isotropy of the graphite particles, and suppressing the breakdown of the graphite particle during the pressing, and further keeping the permeability of the electrolyte among the graphite particles.

The present invention allows production of a negative electrode material for the lithium ion secondary battery containing a graphite particle having high density and high isotropy. In addition, the present invention provides a negative electrode of the lithium ion secondary battery and a lithium ion secondary battery excellent in various properties including the initial efficiency, cycle characteristics, and, discharge load characteristics. This application is based on Japanese Patent application No.2003-198056 filed on Jul. 16, 2003, the contents of which are hereby incorporated by reference.

What is claimed is:

1. A process for manufacturing a material for a negative electrode of a lithium ion secondary battery, comprising isostatically pressing a spherical graphite having voids inside a particle thereof to decrease the voids; providing an apparatus that comprises a tank, a feeder and an inward-directed nozzle; supplying a flake graphite into the tank through the feeder; supplying a jet stream from the inward-directed nozzle to form a collision area at the lower portion of the tank; bringing the flake graphite into collision in the jet stream to form a spherical graphite, wherein the inward-directed nozzle discharge pressure is set from 0.01 to 0.50 MPa, the flow rate of the gas supplied from the inward-directed nozzle is set from 0.2 to 1.0 $Nm^3$/min, the internal pressure in the tank is set from −10 to 30 KPa, and the operational period is set from 1 to 100 minutes.

2. The process for manufacturing a material for a negative electrode of a lithium ion secondary battery according to claim 1, comprising the steps of
pressing the spherical graphite isostatically to obtain a molded material, and
pulverizing the molded material.

3. The process for manufacturing the material according to claim 1, wherein said graphite is a spherical graphite having a peak intensity ratio ($Ih_{110}/Ih_{002}$) of 0.004 or more, wherein the peak intensity ratio ($Ih_{110}/Ih_{002}$) is a ratio of the peak intensity ($Ih_{110}$) assigned to 110 plane to the peak intensity ($Ih_{002}$) assigned to 002 plane as determined by X-ray diffraction measurement.

4. The process for manufacturing the material according to claim 1, further comprising forming a flake graphite into the spherical graphite.

* * * * *